US008745516B2

(12) United States Patent
Mason et al.

(10) Patent No.: US 8,745,516 B2
(45) Date of Patent: *Jun. 3, 2014

(54) REAL TIME MAP RENDERING WITH DATA CLUSTERING AND EXPANSION AND OVERLAY

(75) Inventors: Ralph Mason, Lincoln (NZ); Jason Koch, Aliso Viejo, CA (US)

(73) Assignee: Telogis, Inc., Aliso Viejo, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/882,930

(22) Filed: Sep. 15, 2010

(65) Prior Publication Data

US 2011/0041088 A1 Feb. 17, 2011

Related U.S. Application Data

(63) Continuation of application No. PCT/US2010/045630, filed on Aug. 16, 2010.

(60) Provisional application No. 61/274,221, filed on Aug. 14, 2009.

(51) Int. Cl.
*G06F 3/048* (2006.01)

(52) U.S. Cl.
USPC .......................... 715/767; 715/855; 715/772

(58) Field of Classification Search
CPC .... G06F 3/048; G06F 3/0481; G06F 3/04817
USPC ......................................... 715/767, 855, 772
See application file for complete search history.

(56) References Cited

U.S. PATENT DOCUMENTS

| 5,638,523 A | 6/1997 | Mullet et al. |
| 5,808,907 A | 9/1998 | Shetty et al. |
| 5,904,727 A | 5/1999 | Prabhakaran |
| 6,025,843 A | 2/2000 | Sklar |
| 6,075,530 A | 6/2000 | Lucas et al. |
| 6,097,998 A | 8/2000 | Lancki |
| 6,112,015 A | 8/2000 | Planas et al. |

(Continued)

FOREIGN PATENT DOCUMENTS

| CA | 2 607465 A1 | 4/2008 |
| WO | WO 02/075667 A1 | 9/2002 |
| WO | WO 2008/110962 | 9/2008 |
| WO | WO 2011/116330 A2 | 9/2011 |

OTHER PUBLICATIONS

International Search Report and Written Opinion, International Application No. PCT/US2010/045630, dated Mar. 30, 2011.

(Continued)

*Primary Examiner* — Daeho Song
(74) *Attorney, Agent, or Firm* — Knobbe Martens Olson & Bear LLP

(57) ABSTRACT

Systems and methods are provided for the organization, management, and graphical display of multiple logically related entities. In some embodiments, the systems and methods provide the real-time display of status and location information for a fleet of tracked vehicles. In some embodiments, the systems and methods permit the automatic clustering of assets based on a user's view of an underlying map. In some embodiments, the assets are vehicles that are a part of a managed fleet. In some embodiments, the assets are logically arranged into clusters of like assets. In some embodiments, the clusters provide graphical indications of status or class information of their underlying assets.

9 Claims, 16 Drawing Sheets

(56) References Cited

U.S. PATENT DOCUMENTS

| | | | |
|---|---|---|---|
| 6,144,920 A | 11/2000 | Mikame | |
| 6,216,134 B1 | 4/2001 | Heckerman | |
| 6,252,605 B1 | 6/2001 | Beesley et al. | |
| 6,308,120 B1 | 10/2001 | Good | |
| 6,339,745 B1 | 1/2002 | Novik | |
| 6,477,452 B2 | 11/2002 | Good | |
| 6,611,755 B1 | 8/2003 | Coffee et al. | |
| 6,879,910 B2 | 4/2005 | Shike et al. | |
| 7,143,100 B2 | 11/2006 | Carlson et al. | |
| 7,158,136 B2 | 1/2007 | Gannon | |
| 7,174,243 B1* | 2/2007 | Lightner et al. | 701/32.4 |
| 7,323,982 B2 | 1/2008 | Staton et al. | |
| 7,395,140 B2 | 7/2008 | Christie et al. | |
| 7,499,925 B2 | 3/2009 | Moore | |
| 7,587,411 B2 | 9/2009 | De Vorchik | |
| 7,743,346 B2 | 6/2010 | Kyle | |
| 7,756,615 B2* | 7/2010 | Barfoot et al. | 701/25 |
| 7,828,655 B2* | 11/2010 | Uhlir et al. | 463/30 |
| 7,913,179 B2* | 3/2011 | Sheha et al. | 715/769 |
| 7,913,188 B1 | 3/2011 | Krenz et al. | |
| 8,200,376 B2 | 6/2012 | Mattingly et al. | |
| 2002/0077750 A1 | 6/2002 | McDonald et al. | |
| 2002/0111715 A1 | 8/2002 | Richard | |
| 2004/0039504 A1 | 2/2004 | Coffee et al. | |
| 2004/0077347 A1 | 4/2004 | Lauber et al. | |
| 2004/0090950 A1 | 5/2004 | Lauber et al. | |
| 2004/0254698 A1* | 12/2004 | Hubbard et al. | 701/35 |
| 2005/0080520 A1* | 4/2005 | Kline et al. | 701/1 |
| 2005/0090978 A1* | 4/2005 | Bathory et al. | 701/213 |
| 2005/0143909 A1 | 6/2005 | Orwant | |
| 2005/0195096 A1* | 9/2005 | Ward et al. | 340/995.14 |
| 2005/0222933 A1 | 10/2005 | Wesby | |
| 2006/0074553 A1 | 4/2006 | Foo | |
| 2006/0100777 A1 | 5/2006 | Station et al. | |
| 2006/0129691 A1* | 6/2006 | Coffee et al. | 709/230 |
| 2006/0212327 A1 | 9/2006 | Norman | |
| 2008/0014908 A1* | 1/2008 | Vasant | 455/414.1 |
| 2008/0036778 A1* | 2/2008 | Sheha et al. | 345/502 |
| 2008/0045234 A1 | 2/2008 | Reed | |
| 2008/0052142 A1 | 2/2008 | Bailey et al. | |
| 2008/0097731 A1* | 4/2008 | Lanes et al. | 703/2 |
| 2008/0121690 A1 | 5/2008 | Carani | |
| 2008/0125964 A1 | 5/2008 | Carani | |
| 2008/0174485 A1 | 7/2008 | Carani | |
| 2008/0318597 A1 | 12/2008 | Berns | |
| 2009/0003657 A1 | 1/2009 | Deardorff | |
| 2009/0073034 A1 | 3/2009 | Lin | |
| 2009/0077221 A1 | 3/2009 | Eisenstadt | |
| 2009/0292464 A1 | 11/2009 | Fuchs | |
| 2009/0326991 A1 | 12/2009 | Wei et al. | |
| 2010/0076675 A1* | 3/2010 | Barth et al. | 701/200 |
| 2010/0076968 A1 | 3/2010 | Boyns | |
| 2010/0115462 A1 | 5/2010 | Spencer | |
| 2010/0211340 A1 | 8/2010 | Lowenthal et al. | |
| 2011/0016199 A1 | 1/2011 | De Carlo et al. | |
| 2011/0016514 A1 | 1/2011 | De Carlo et al. | |
| 2011/0040440 A1 | 2/2011 | De Oliveira et al. | |
| 2011/0288762 A1 | 11/2011 | Kuznetsov | |
| 2011/0289019 A1 | 11/2011 | Radloff et al. | |
| 2012/0072244 A1 | 3/2012 | Collins et al. | |
| 2012/0101855 A1 | 4/2012 | Collins et al. | |

OTHER PUBLICATIONS

Real-time tracking management system using GPS, GPSR and Google earth; Chadil, N.; Russameesawang, A.; Keeratiwintakorn, P.; Electrical Engineering/Electronics, Computer, Telecommunications and Information Technology, 2008. ECTI-CON 2008. 5th Inter. Conf. on; vol. 1; Digital Object Id: 10.11 09/ECTICON.2008. 4600454; Pub.yr. 2008, pp. 393-396.

A Cost Effective Real-Time Tracking System Prototype Using Integrated GPS/GPSR Module; El-Medany, W.; Al-Omary, A.; Al-Hakim, R.; Al-Irhayim, S.; Nusaif, M.; Wireless and Mobile Communications (ICWMC), 2010 6th International Conference on Digital Object Identifier: 10.1109/ICWMC.201 0.1 04; Publication Year: 2010, pp. 521-525.

UKM campus bus monitoring system using RFID and GIS; Mustapha, A.M.; Hannan, M.A.; Hussain, A.; Basri, H.; Signal Processing and Its Applications (CSPA), 2010 6th International Colloquium on; Digital Object Identifier: 10.11 09/CSPA.201 0.5545246; Publication Year: 2010, pp. 1-5.

Automatic bus routing and passenger geocoding with a geographic information system; Yue-Hong Chou; Vehicle Navigation and Information Systems Conference, 1995, Proceedings, In conjunction with the Pacific Rim TransTech Conference. 6th International VNIS. 'A Ride into the Future; Digital Object Identifier: 10.11 09IVNIS.1995. 518861.

Prognostics, from the need to reality-from the fleet users and PHM system designer/developers perspectives; Hess, A. Aerospace Conference Proceedings, 2002. IEEE; vol. 6; Digital Object Identifier: 10.11 09/AERO.2002.1 036118 Publication Year: 2002, pp. 6-2791-6-2797 vol. 6.

Estimating positions and paths of moving objects; Beard, K.; Palancioglu, H.M.; Temporal Representation and Reasoning, 2000. Time 2000. Proceedings. Seventh International Workshop on; Digital Object Identifier: 10.11 09/TIME.2000.856597 Publication Year: 2000, pp. 155-162.

A framework algorithm for a real-world variant of the vehicle routing problem; Vu Pham; Tien Dinh; Industrial Engineering and Engineering Management (IEEM), 2011 IEEE International Conference on; Digital Object Identifier: 10.1109/IEEM.2011.6118237. Publication Year: 2011, pp. 1859-1863.

Marine fleet allocation using data mining techniques; Ammar, M.H.; Ben Hafssia, S.; Masmoudi, Y.; Chabchoub, H. Logistics (LOGISTIQUA), 2011 4th International Conference on; Digital Object Identifier: 10.11 09/LOGISTIQUA.2011.5939394 Publication Year: 2011, pp. 1-5.

International Preliminary Report on Patentability issued in application No. PCT/US2010/045630 on Feb. 23, 2012.

Office Action issued in New Zealand application No. 597951 on Nov. 8, 2012.

Stodolsky et al., "Technology Options to Reduce Truck Idling", Argonne National Laboratory, Transportation Technology R&D Center, University of Chicago, 16 pages, Mar. 15, 2001.

Barcelo et al., "Vehicle Routing and Scheduling Models, Simulation and City Logistics", Dept of Statistics and Operations Research, Universitat Politecnica de Catalunya, pp. 1-29 (accessed Aug. 22, 2011).

Maclean et al., "Real-time Bus Information on Mobile Devices", Department of Electrical Engineering, University of Washington, pp. 1-6 (accessed Aug. 22, 2011).

Van De Peer et al., "TREECON: a Software Package for the Construction and Drawing of Evolutionary Trees", Computer Applications in the Biosciences, IRL Press at Oxford University Press, 9(2):177-182 (1993).

Shepard, "Multidimensional Scaling, Tree-Fitting, and Clustering", Science, New Series, 210(4468):390-398 (Oct. 24, 1980).

Zhang et al., "Birch: An Efficient Data Clustering Method for Very Large Databases", Sigmod, pp. 103-114 (1996).

\* cited by examiner

REAL TIME MAP RENDERING WITH DATA CLUSTERING AND EXPANSION AND OVERLAY

CROSS-REFERENCE TO RELATED APPLICATIONS

This application is a continuation application of International Patent Application No. PCT/US2010/45630, filed Aug. 16, 2010 and entitled "Real Time Map Rendering with Data Clustering and Expansion and Overlay", which claims priority to U.S. Provisional Patent Application Ser. No. 61/274,221, filed Aug. 14, 2009 and entitled "Real Time Map Rendering with Data Clustering and Expansion and Overlay," both of which applications are incorporated herein by reference to the extent they are not inconsistent with the disclosure herein.

BACKGROUND

1. Field

This invention generally relates to systems and methods for organizing, managing, and graphically displaying multiple logically related entities and, more specifically, in one embodiment, to systems and methods for the real time organization and display of clusters of tracked vehicles in connection with a geographical map.

2. Description of Related Art

As the use of electronic maps to display information has increased in popularity, so has the volume and complexity of information to be displayed. Accordingly, it has become more and more difficult to take in the wide range of data that may be overlaid and viewed on maps without the viewer becoming confused or overwhelmed by the display.

This problem is acutely expressed in the field of map-based or location-based services and tools, where the ever increasingly detailed nature of the information to be displayed, together with the potentially limitless number of sources from which data is gathered, combine to make it extremely challenging to display such information on a map in a logical manner that is accessible and useful to viewers. For instance, the management of large numbers of people and equipment involves obtaining timely information about location, status, and potential alarm conditions. Management preferably wants to be able to observe when and where scheduled events have occurred and how schedules and status have changed since the previous observations, but doing so in prior systems was difficult if not impossible with so much data available. For example, in the field of fleet management, it is desirable to know the status of vehicles in a fleet, where the vehicles currently are, whether the vehicles are operating properly, etc. For fleets with hundreds or thousands of vehicles, such information quickly became overwhelming when accessed through a map-based interface.

Developers have attempted to facilitate the ease of use of such map-based displays by allowing viewers to zoom in and out of the maps at issue; however, this is often an ineffective solution since the problem of viewing an overwhelming amount of data is only amplified as the viewer zooms out to get a more general picture of the data. As a result, in order to make sense of the displayed data, the viewer's only choice is to zoom in so far on the map that important information is no longer displayed onscreen. Other systems simply operate too slowly to meet the demands of full time asset management.

SUMMARY

The present embodiments overcome these and other deficiencies of the prior art by providing systems and methods for smart zooming that cluster geographically or spatially related information together to create useful overlays of data to facilitate the management of such information. In some embodiments, the information pertains to vehicles being tracked. In some embodiments, the systems and methods provide the real-time display of status and location information for a fleet of tracked vehicles. In some embodiments, the systems and methods permit the automatic clustering of assets based on a user's view of an underlying map, which change dynamically as a user zooms in or out of a map. In some embodiments, the assets are vehicles that are a part of a managed fleet. In some embodiments, the assets are logically arranged into clusters of like assets. In some embodiments, the clusters provide graphical indications of status or class information of their underlying assets.

In some embodiments, a method for displaying information pertaining to a plurality of geographically related assets is provided. The method includes receiving information pertaining to a plurality of assets; selecting the assets from the plurality of assets that are geographically related; forming a cluster comprising the selected assets; and providing a graphical user interface comprising a geographic map and the cluster. In some embodiments, the assets, are geographically related if the physical location of the assets are within a geographic area defined by a virtual bounding area. In some embodiments, the cluster is overlayed on the geographic map in the geographic area defined by the bounding area. In some embodiments, the cluster displays on the graphical user interface at least one item of information pertaining to the selected assets. In some embodiments, the assets are vehicles. The information pertaining to the plurality of assets is, in some embodiments, updated in real time. In some embodiments, at least one item of information is a chart displaying status information for the selected assets. In some embodiments, at least one item of information is a chart displaying the class information for the selected assets. In some embodiments, at least one item of information is a numerical indication of the number of selected assets. In some embodiments, the graphical user interface displays the virtual bounding area. In some embodiments, the method also includes adding the cluster to a new cluster if a user of the graphical user interface zooms out from the geographic map. In some embodiments, the method also includes splitting the cluster into a plurality of clusters if a user of the graphical user interface zooms in on the geographic map.

In some embodiments, a method for splitting a cluster of assets is provided, where each asset has pixel coordinates based on its geospatial location and in reference to a virtual area representing an end user's display. The method, in some embodiments, comprises identifying the coordinates of each asset; dividing the virtual area into slots; grouping the assets into the slots based on each assets' pixel coordinates; and generating new clusters, wherein each new cluster comprises at least one asset and comprises every asset which was grouped into the same slot.

In some embodiments, a method for clustering assets is provided. The method, in some embodiments, includes generating pixel coordinates for each asset based on the asset's geospatial location and in reference to a virtual area representing an end user's display; determining an icon shape with specific pixel dimensions for use in connection with each asset; querying a data structure with the icon shape for each asset; adding an asset as a new cluster in the data structure if the area defined by the pixel dimensions of the asset's icon shape, when centered over the asset's pixel coordinates, does not overlap with the area covered by another cluster in the data structure; and adding an asset to an existing cluster in the data structure if the area defined by the pixel dimensions of the asset's icon shape, when centered over the asset's pixel coordinates, overlaps with the area covered by the existing cluster.

BRIEF DESCRIPTION OF THE DRAWINGS

For a more complete understanding of the present embodiments, the objects and advantages thereof, reference is now made to the following descriptions taken in connection with the accompanying drawings in which.

Figure 1:
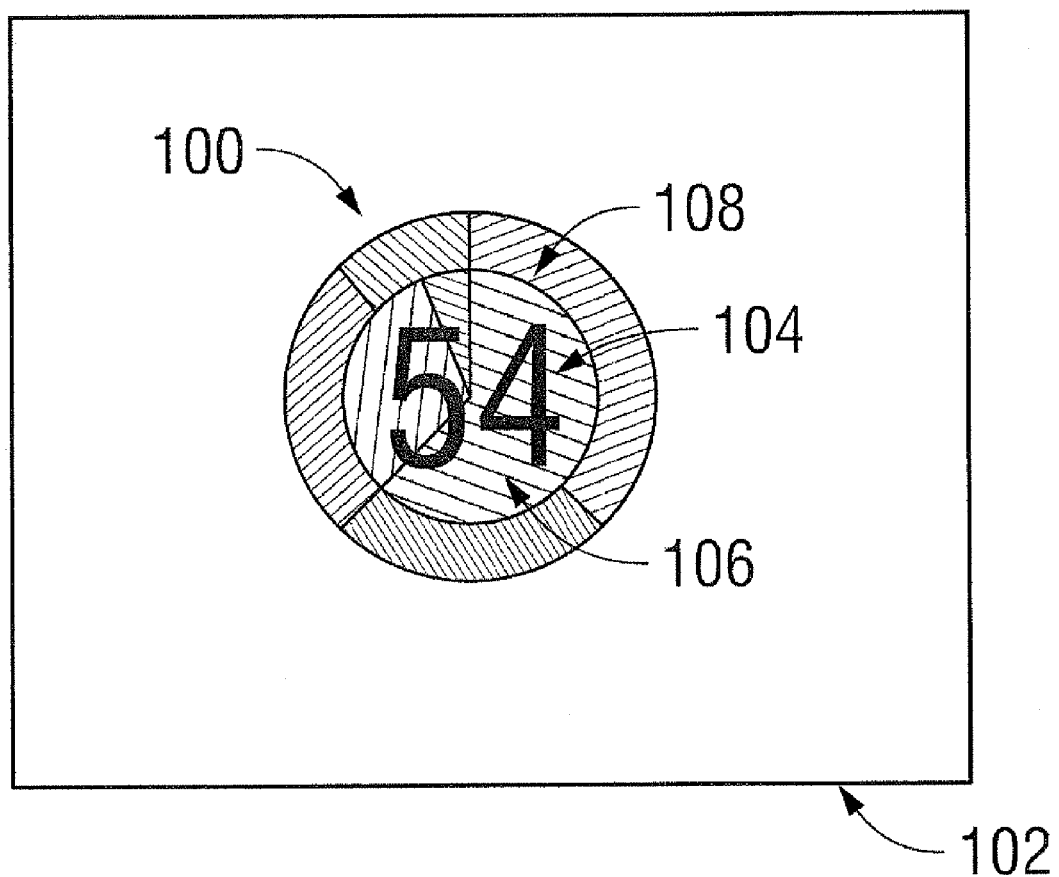
FIG. 1 depicts a cluster of assets, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION OF THE DRAWINGS

Further features and advantages of the present embodiments, as well as the structure and operation of the various embodiments, are described in detail below with reference to the accompanying FIGS. 1-16. The embodiments are described in the context of a system for displaying clusters of tracked vehicles on a map. Nonetheless, one of ordinary skill in the art readily recognizes that these embodiments are applicable in numerous fields and contexts which require the display of multiple disparate pieces of information in a useful manner, and particularly with respect information with geographical or special components, such as real estate information, package or delivery information, communications information, etc.

Referring now to FIG. 1, depicted is a cluster 100. The cluster 100 provides information about underlying assets in a specific geographical or spatial location, defined by a bounding area 102. The cluster 100, in some embodiments, comprises a numerical value 104 and an inner chart 106. In some embodiments, the cluster 100 comprises an outer chart 108, or additional charts or graphical information (not depicted). For example, if the assets are vehicles, then the numerical value 104 displays the number of vehicles within the cluster 100, and the charts 106 and 108 provide detailed class and status information about those vehicles. Inner chart 106, for example, contains color coded class information for each asset in the cluster 100. For example, in the context of vehicles, the vehicles may be classified as semi-trucks, pickups, mobile cranes, cars, or other type of vehicle, each with a unique color. Inner chart 106 will therefore display a color coded pie chart representing the percentage of vehicles in the cluster 100 that make up each class. Outer chart 108, for example, depicts color coded status information for each asset in the cluster 100. For example, in the context of vehicles, the vehicles may be moving, stopped, idle, out of contact, or have another status depending upon the specific application. Outer chart 108 will therefore display a color coded pie chart representing the percentage of vehicles in the cluster 100 with each given status. The specific class and status information to be depicted by the charts 106 and 108, as well as the colors assigned to such information, are configurable by the user of the system using known methods. Furthermore, the size, shape, and configuration of the cluster 100 is also modifiable. For instance, in some embodiments, clusters are given different shapes to indicate that the clusters pertain to different types of assets or different types of information. For example, a first cluster may be round, indicating it pertains to vehicles, and a second cluster may be square, indicating it pertains to jobs to be performed during a day. As the jobs are completed, the colored status information for the cluster changes, reflecting the progress made on the job. In some embodiments, the corners of a square or other angular cluster changes colors. For ease of understanding only, the present application generally depicts clusters herein as circles or squares, with circular inner and outer charts.

The information in the cluster 100 is, in some embodiments, updated in real time. For example, as a vehicle leaves or enters the bounding area 102, the numerical value 104 and charts 106 and 108 are updated accordingly. If the status of an asset changes, the outer chart 108 likewise is updated. Such real-time updates are configurable by the user of the system and may be dependant on the communication systems of the assets. For instance, a user of the system may only desire updates once every five minutes. Alternatively, an asset may be programmed to only provide its location and other status information once every thirty seconds, or only when its status or location changes. Those of ordinary skill in the art will therefore recognize the information displayed by the cluster 100 may, in some embodiments, be delayed based on these contingencies or preferences. Alternatively, the updating of information can be done, for example, when the map is resized.

In some embodiments, not all assets in a specific bounding area 102 are included in the cluster 100. For instance, the cluster 100 may only comprise assets of a certain type, such as only vehicles. In other embodiments, the cluster 100 may only comprise assets owned by a specific entity, such as a single rental car company. The specific assets that are included in a cluster 100 may be selected based on numerous attributes, such as the asset's status, class, physical attributes, type, ownership information, etc. In some embodiments (not shown), the bounding area 102 comprises more than one cluster. Each of clusters may comprise assets that, but for the preferences of the user specified to the system, would be included in the same cluster, or assets that, due to different attributes, belong in different clusters. For the sake of clarity, the following discussion only discusses a single cluster 100 being within a single bounding area 102. The bounding area 102, as shown, is a square or rectangle, but other shapes, such as polygons, circles, triangles, or other regular or irregular shapes or any combination thereof, are used in other embodiments. Furthermore, in some embodiments, the bounding area 102 may have different colors or levels of opacity. By altering the alpha channel value (the opacity) and/or the color of the bounding area 102, additional information can be displayed pertaining to each bounding area 102 displayed on a map, such as which bounding area 102 contains more assets.

Figure 2:
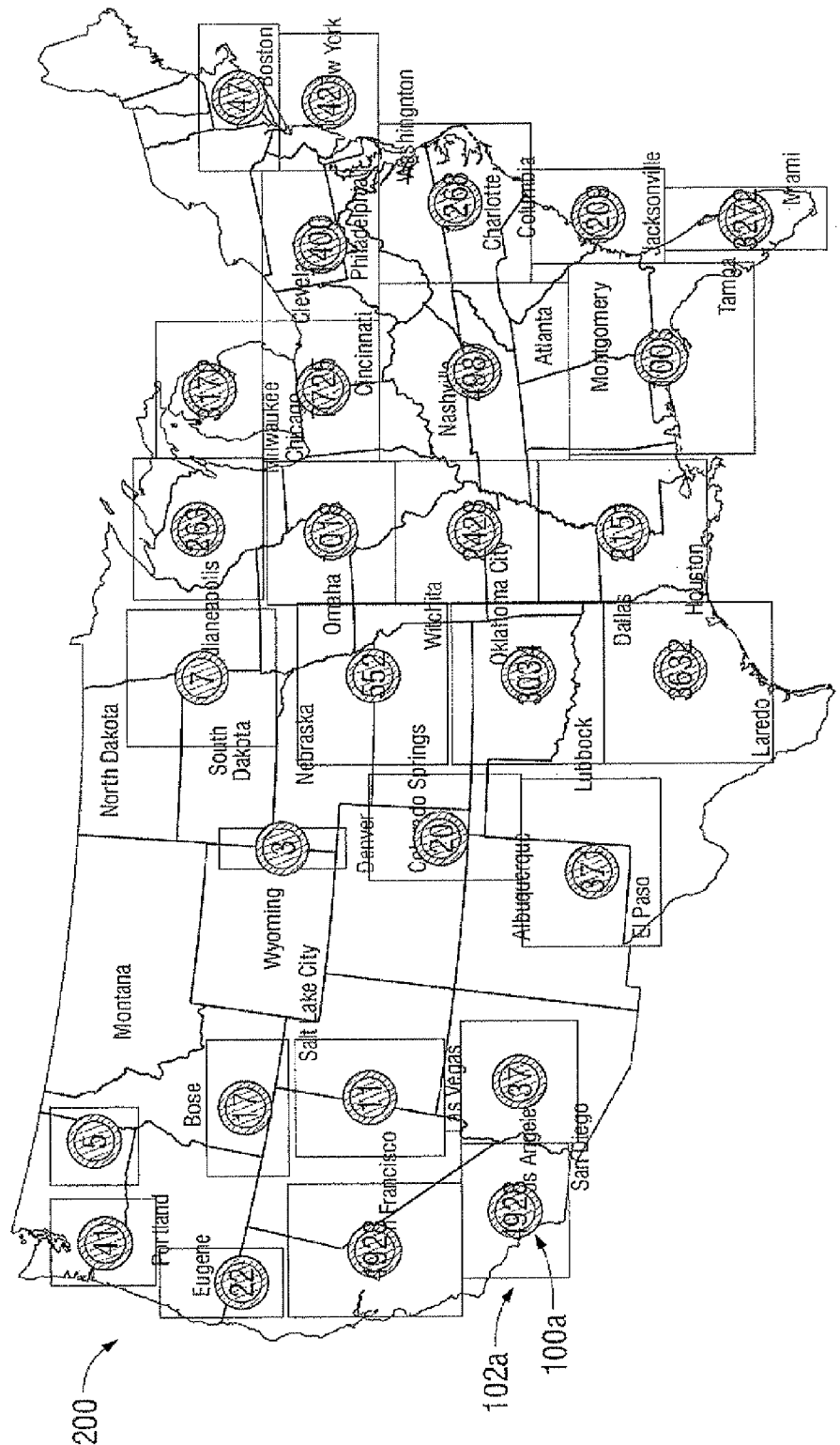
FIG. 2 depicts a geographical map comprising a plurality of clusters, according to an embodiment.

Referring now to FIG. 2, depicted is a geographical map 200 comprising a plurality of clusters 100a-n, according to an embodiment. As depicted, the map 200 displays the entire continental United States. Because of the high-level of the map 200, each cluster 100 and its corresponding bounding area 102a-n covers a large area of the United States, and therefore includes a relatively large number of assets. For instance, cluster 100a, whose bounding box 102a encompasses Los Angeles, contains over four-thousand, five-hundred assets. In other embodiments, however, a large area can encompasses only a small number of assets.

Figure 3:
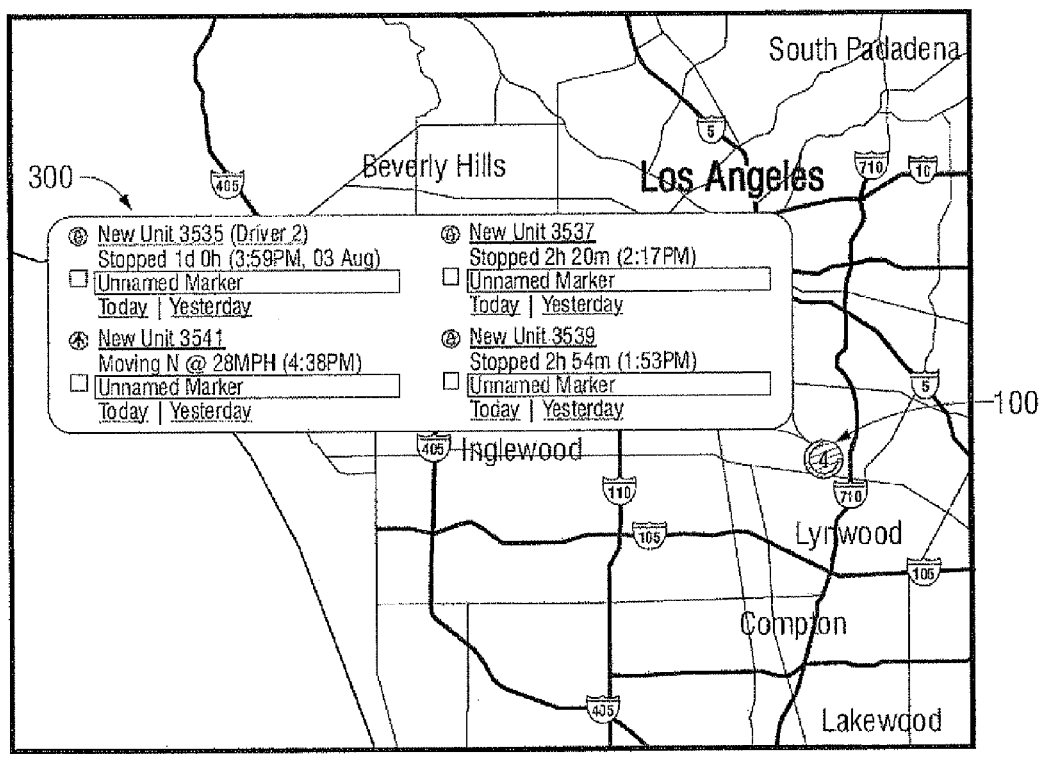
FIG. 3 depicts additional informational features available to the user of the system, according to one embodiment.

Referring now to FIG. 3, depicted are additional informational features available to the user of the system, according to one embodiment. As depicted, when a user selects a cluster 100, such as when a user points his or her mouse over the cluster 100, clicks on the cluster 100, uses a touch screen to select the cluster 100 or otherwise selects or interacts with the cluster 100, the system provides the user with certain information pertaining to the assets in the cluster 100. For instance, depicted is a pop-up box 300 with detailed asset information for each asset in the cluster 100. The pop-up box 300 displays, for example, the name, status, and class of each asset in the cluster 100, and provides the option for the user to look at the history for each asset by clicking the "Today" or "Yesterday" links. In some embodiments, scaled icons representative of the assets are depicted on the map to provide visual identification to the user where the assets are. In some embodiments, the user can also click on each asset in the pop-up box 300 to be directed to the specific location of the asset on the map. The embodiment discussed with reference to FIG. 3 is useful for clusters 100 with a few assets, such as, for example, four or fewer assets, but may provide too much detailed information when a cluster has a many assets.

Figure 4:
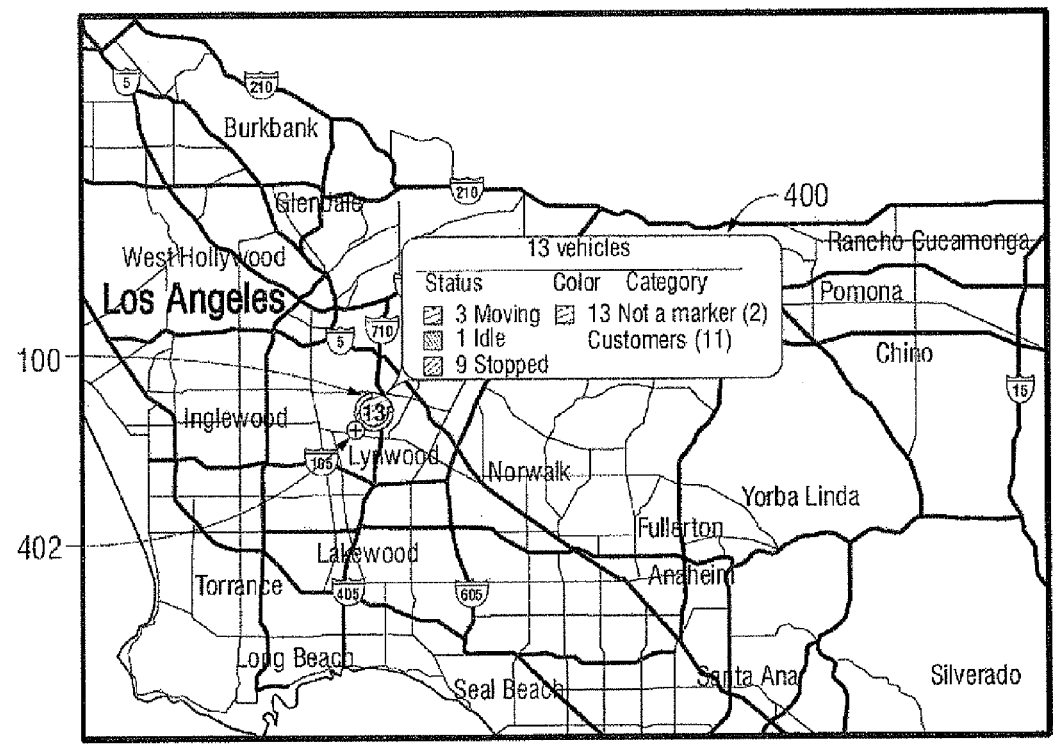
FIG. 4 depicts informational features available to the user of the system when a cluster contains a large number of assets, according to an embodiment.
Figure 5:
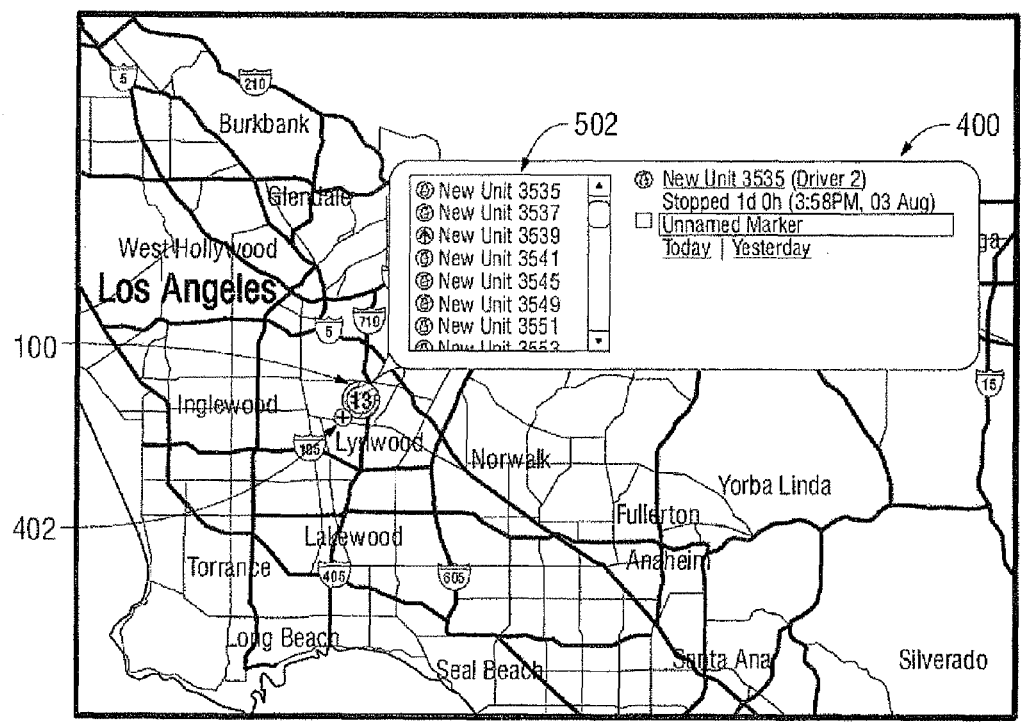
FIG. 5 illustrates a scrollable list of a cluster's assets, according to an embodiment.

Referring now to FIG. 4, depicted are additional informational features available to the user of the system when a cluster 100 contains a large number of assets, according to an embodiment. As depicted, when a user selects a cluster 100, the system provides the user with pop-up box 400 displaying certain high level information pertaining to the assets in the cluster 100, such as general status and category information about the assets. In some embodiments, the cluster 100 further displays a "+" sign or similar notation 402, signifying even more information pertaining to the assets in the cluster 100 is available. Referring now to FIG. 5, when the user clicks the "+" sign 402, in one embodiment, a scrollable list 502 of the cluster's assets is displayed to the user in the pop-up box 400. The user can select an asset from the scrollable list 502, the detailed information of which is thereafter displayed pop-up box 400 in a similar manner to that depicted in FIG. 3. In this manner, detailed information pertaining to each asset in the cluster 100 is available to the user, even when the cluster 100 has a large number of assets.

Figure 6A:
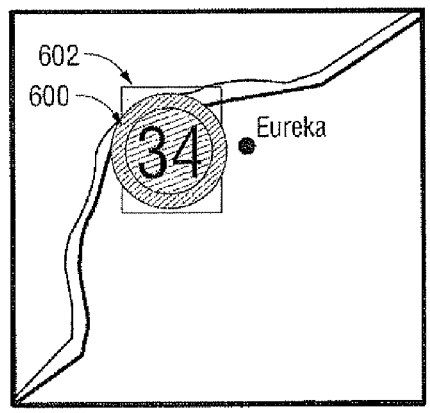
FIG. 6 illustrates the function of clusters with reference to a specific geographical location, according to an embodiment.
Figure 6B:
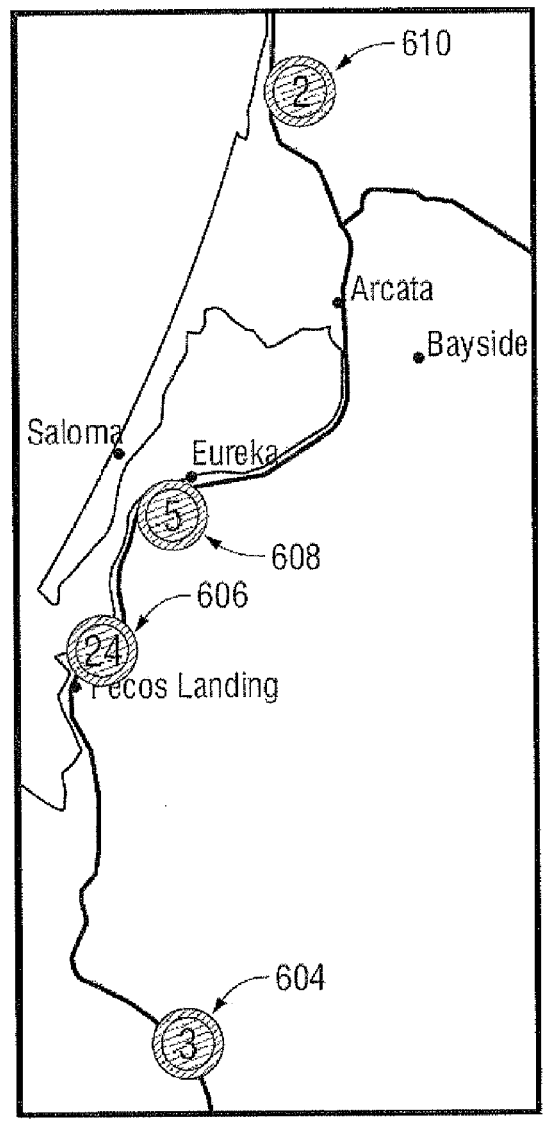

Referring now to FIGS. 6a and 6b, the function of clusters with reference to a specific geographical location, according to an embodiment, is now discussed in more detail. Depicted in FIG. 6a is a cluster 600 with a bounding area 602 encompassing much of Eureka, Calif. As is apparent, the cluster 600 comprises 34 assets. When a user zooms in on the cluster 600, as depicted in FIG. 6b, cluster 600 is replaced with four new clusters 604-610. Collectively, the new clusters 604-610 comprise the same assets as cluster 600. New clusters 604-610, however, are more accurately positioned on the map to reflect the location of their underlying assets. Thus, as depicted in FIG. 6b, a user can see there are 3 assets in Fortuna, and 2 assets in McKinleyville, with the remaining assets located near Eureka and Fields Landing. If a user zooms in to the point where it is useful to display individual assets, a cluster is replaced with the accurate real-time location of each asset within the cluster. Alternatively, in some embodiments, a user can click one of the clusters 604-610 to display the location of each of its assets. If a user zooms out of a specific area, such as zooming out from FIG. 6b to FIG. 6a, or from FIG. 6a to FIG. 2, the clusters are combined and become more general and less tied to a specific spatial location. Thus, the rendering and re-rendering of maps and their respective clusters is hierarchical.

In some embodiments, the structure of assets and clusters can be thought of as follows:

---

(a) Asset

CLASS
STATUS
ATTRIBUTES
(b) Point

COMPRISING: Assets
LOCATION (longitude, latitude)
(c) Zone

COMPRISING: Points
(d) Area

COMPRISING: Zones
(e) Regions

COMPRISING: Areas

--- and so on, through higher levels of clusters.

Figure 7:
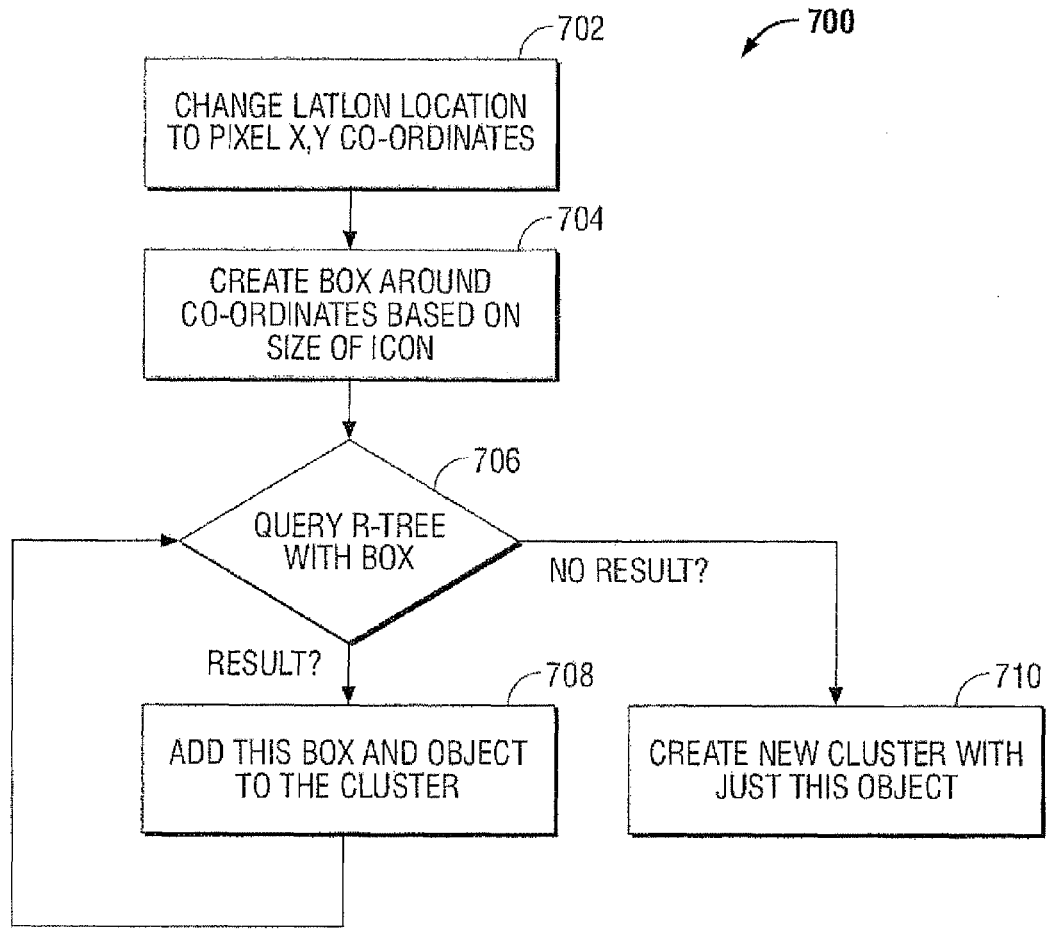
FIG. 7 illustrates is a flow chart describing the creation of a cluster, according to an embodiment.

The manner in which the system clusters assets (or clusters) and splits clusters as discussed above is now described in more detail, according to an embodiment. Referring to FIG. 7, depicted is a flow chart 700 describing in detail the creation of a cluster. First, at step 702, the latitudinal and longitudinal coordinates of the item to be clustered (either an asset or a cluster) are determined, and, using standard reprojection techniques, are converted to x and y pixel coordinates based on the user's display. Next, in step 704, a box (or other shape) is created around the x and y coordinates indicative of the size of the item's icon size. For instance, in some embodiments, the icon a user sees for a cluster is 30 pixels by 30 pixels. Thus, in step 704, a 30×30 pixel box is placed around the determined x and y coordinates for such cluster. In step 706, an R-Tree, a well-known data structure familiar to those with skill in the art, is queried with the box to determine whether the box is already in the system. As shown in outcome 708, if the box is already part of an existing cluster in the system, the box and its item is added to that cluster. Otherwise, as shown in outcome 710, the box and its item are added as a new cluster. The forgoing process repeats for each item to be clustered. While the embodiments are described herein with reference to an R-Tree, those of ordinary skill in the art will recognize other types of trees and data structures may be used to implement other embodiments, and that the type and configuration of such data structures will depend, for example, on the specific application and functionality desired.

Figure 8A:
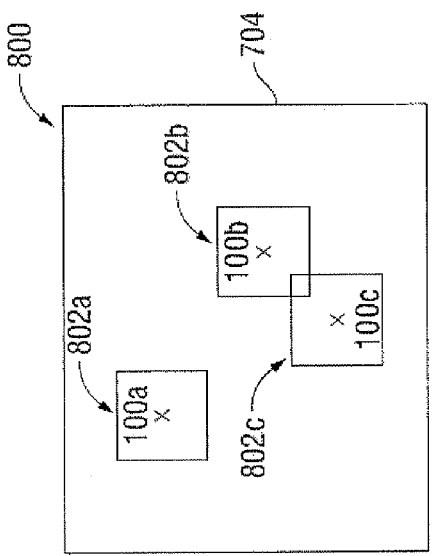
FIG. 8 depicts a graphical example of the steps carried out in FIG. 7, according to an embodiment.
Figure 8B:
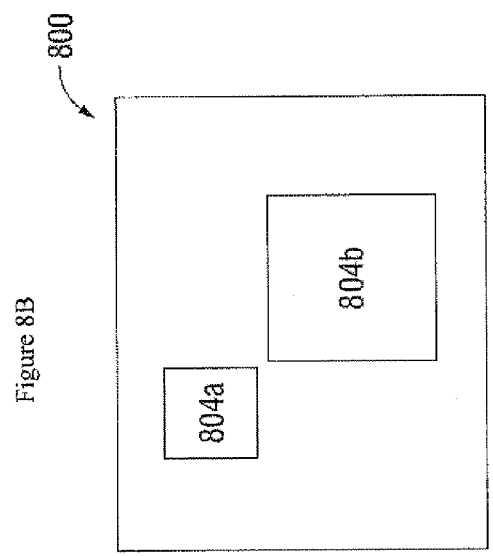
Figure 8C:
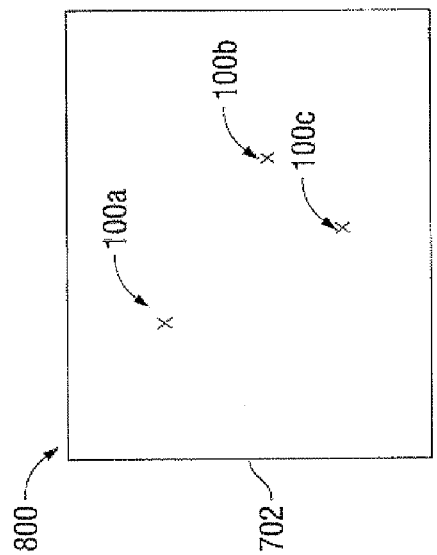
Figure 8D:
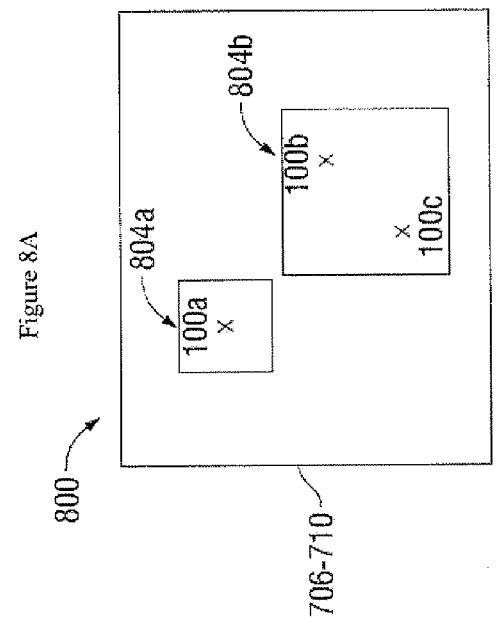

Referring now to FIGS. 8a-d, depicted is a graphical example of the steps carried out in the flow chart 700, according to an embodiment. As shown in FIG. 8a, and as described with reference to step 702, assets 100a-100c with real world latitudes and longitudes are reprojected to x and y pixel coordinates based on a user's display 800. In FIG. 5b, and in accordance with step 704, a box or other icon shape 802a-c is created around each asset 100a-c. In accordance with steps 706-710, each box 802a-c is then used to query the R-Tree. The R-Tree is first queried with box 802a. Since the R-Tree is empty, the R-Tree will not return a result, and box 802a is added to the R-Tree as a new cluster 804a, as shown in FIG. 8c. The R-Tree is next queried with box 802b. As depicted in FIG. 8b, since there is no overlap between box 802a (which is already in the R-Tree) and box 802b, the R-Tree again will not return a result, and box 802b is added to the R-Tree as a new cluster 804b. The R-Tree is next queried with box 802c. As shown in FIG. 5b, there is overlap between box 802b and 802c. The R-Tree will therefore return cluster 804b as a result, and box 802c is added that cluster, as shown in FIG. 8c. As shown in FIG. 8c, cluster 804b expands to comprise boxes 802b and 802c. As a result of the foregoing steps, the two clusters 804a-b are depicted to the user, with the underlying boxes and asset information are no longer displayed, as shown in FIG. 8d.

In some embodiments, the method described with reference to FIGS. 7 and 8 may produce clusters with too many items (either too many assets or other clusters). In order to make the clusters that have been created more usable, the clusters are thereafter split into smaller, more usable clusters. By splitting clusters, the information contained in the clusters is, in some embodiments, more evenly distributed across the user's screen view.

In some embodiments, clusters are split if they are either horizontally or vertically larger than a defined variable M (cluster maximum size). This variable, for example, is based on the resolution of the user's screen and on the size of typically icons used with the system. On a standard screen using icons of 32 pixels wide, M is, in some embodiments, set at 100 pixels. Those of ordinary skill in the art will recognize that other values for M may be optimal, depending on the user's screen's resolution and size, the size of the icons used in connection with the system, or other variables.

If a cluster is to be split, then the cluster is split both horizontally and vertically. Vertical and horizontal maximum pixel values for the new clusters are, in some embodiments, based on the following formulas:

$$Y_{split} = M - 2(ICON_{width})$$

$$X_{split} = Y_{split}/2 + Y_{split}$$

Where $Y_{split}$ is the maximum horizontal pixel value and $X_{split}$ is the maximum vertical pixel value, and $ICON_{width}$ is the width, in pixels, of the asset or cluster icons. The foregoing formulas take into account the dimensions of the icons to ensure clusters will not overlap on a user's screen. Based on the foregoing, where M is set to 100 pixels and the icons are 32 pixels, each new cluster must be less than 54 pixels wide, and must be less than 36 pixels tall.

Figure 9:
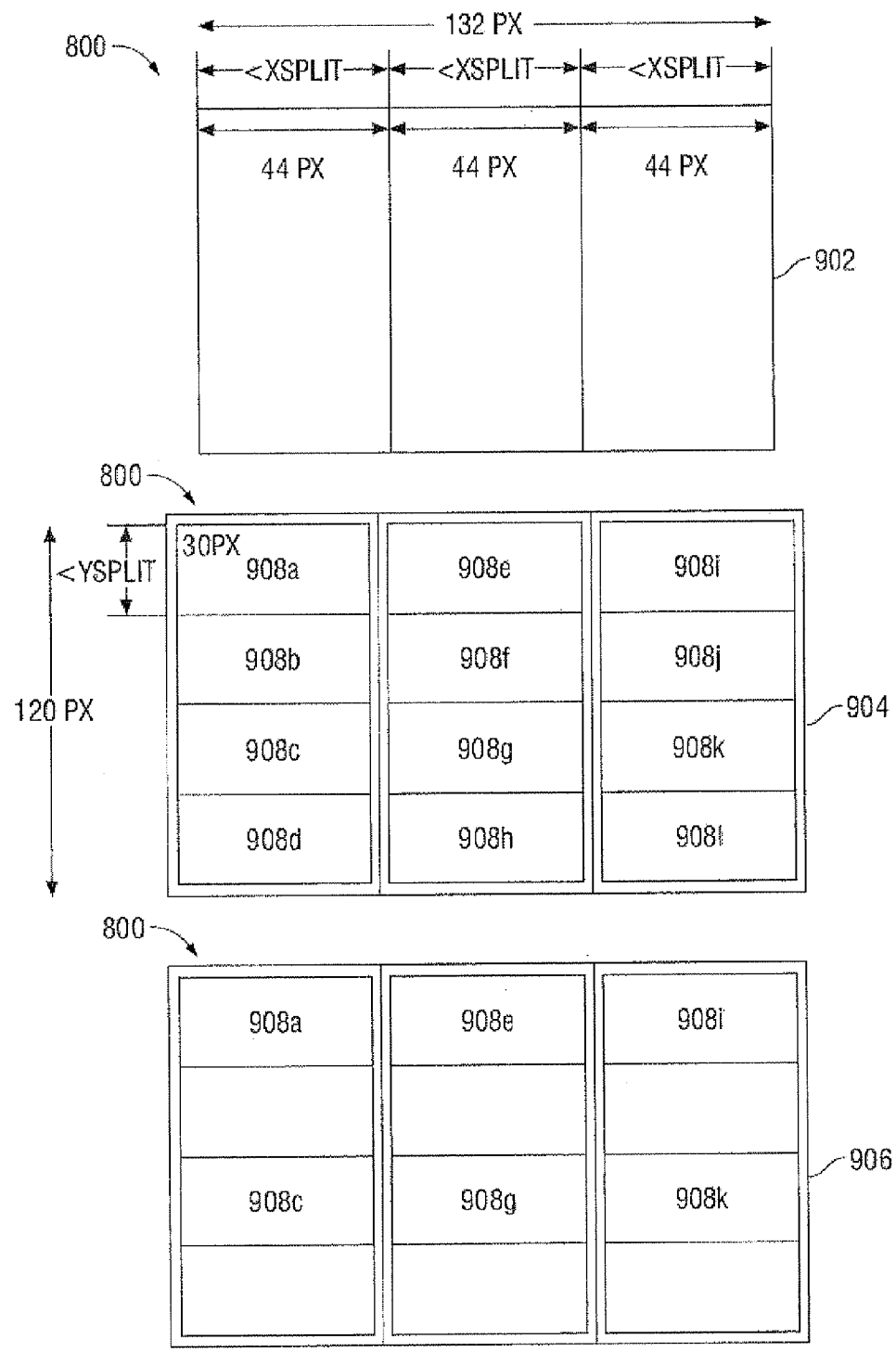
FIG. 9 depicts a process for splitting a cluster, according to an embodiment.

Referring now to FIG. 9, depicted is a process for splitting a cluster 900 according to an embodiment. For example, given a cluster with a width of 132 pixels wide, the cluster is first split horizontally in step 902 into the minimum number of sections for which each section is less than $X_{split}$, (54 pixels) wide. The cluster is therefore first divided into three sections, each with a width of 44 pixels. As shown in step 904, each section obtained in step 902 is then split horizontally into sections less than $Y_{split}$ (36 pixels) tall. As a result, the original cluster 900 is, divided into 12 slots 906a-l, each with dimensions of 44 pixels by 30 pixels. In step 906, the new clusters are created. In some embodiments, the even numbered slots are retained (i.e. slots 908a, 908c, 908e, 908g, 908i, and 908k), while the odd numbered slots are discarded. Any items in the odd numbered slots are moved one slot up (i.e. items in slot 908b are moved to slot 908a, and so on). The retained slots become the new clusters.

Figure 10:
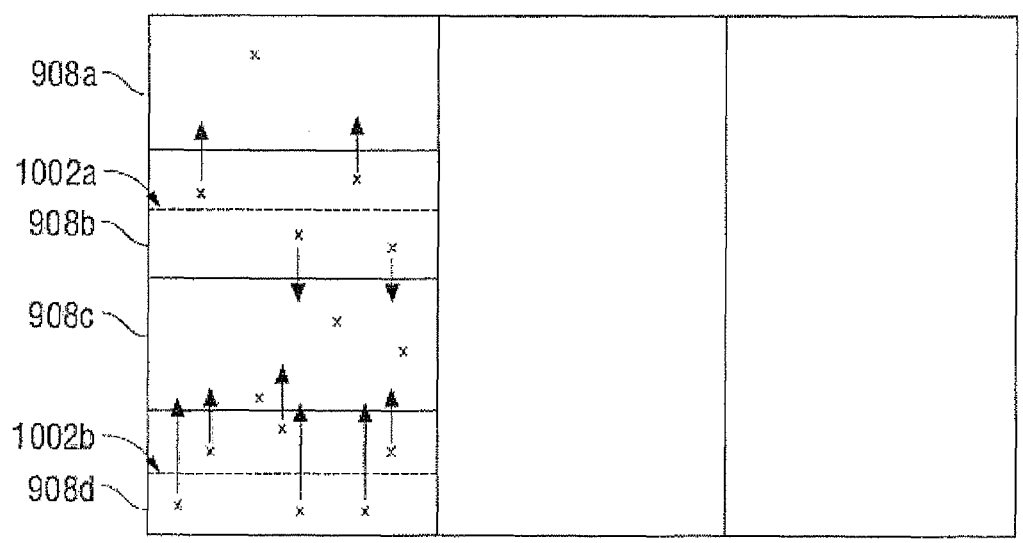
FIG. 10 illustrates items being moved from odd slots to even slots during the splitting process, according to an embodiment.

Referring now to FIG. 10, depicted is an example of items being moved from odd slots 908b and 908d to even slots 908a and 908c, according to an embodiment. As depicted, the odd slots 908b and 908d are divided in half horizontally, as shown with the dotted lines 1002a and 1002b. Items in the odd numbered slots 908b and 908d that are above their respective dotted lines 1002a and 1002b are moved to the even numbered slots above, while items in the odd numbered slots 908b and 908d that are below their respective dotted lines 1002a and 1002b are moved to the even numbered slots below. Where, as in the case of slot 908d, there is no even numbered slot below the odd numbered slot, all of the items in the odd numbered slot are moved to the even numbered slot above. Thus, as depicted, all of the items in odd slot 908d are moved to even slot 908c.

Figure 11:
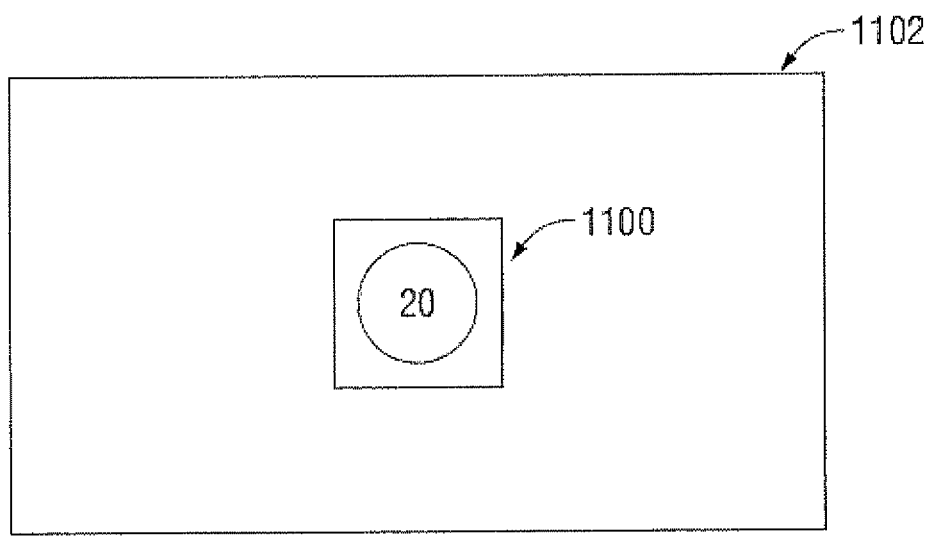
FIG. 11 depicts a sample cluster with reference to a display screen that is to be split, according to an embodiment.
Figure 12:
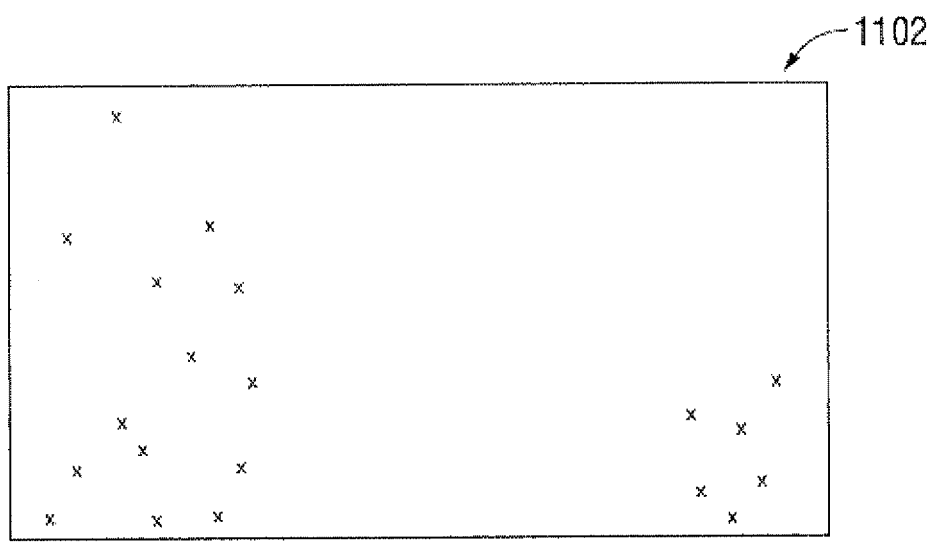
FIG. 12 depicts the location of a cluster's items with reference to a display screen, according to an embodiment.
Figure 13:
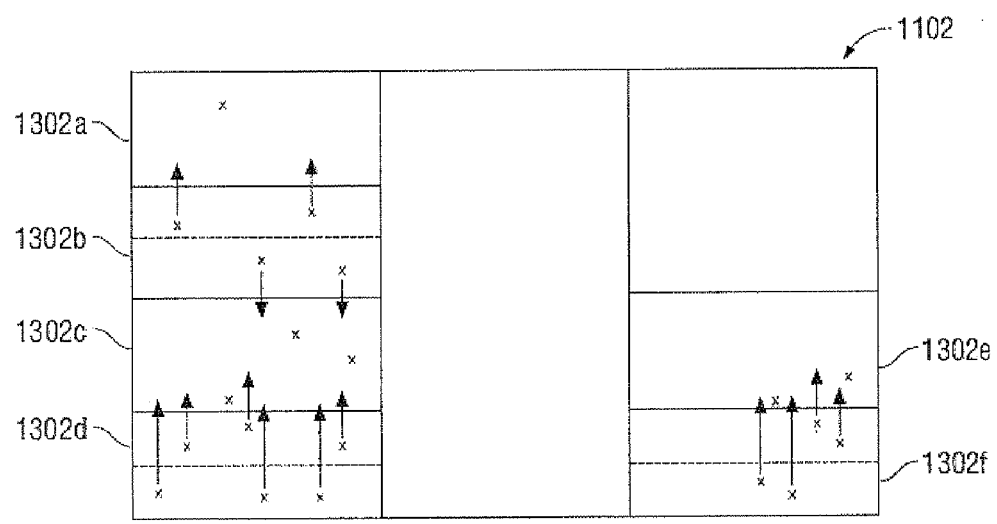
FIG. 13 illustrates a cluster being split, according to an embodiment.
Figure 14:
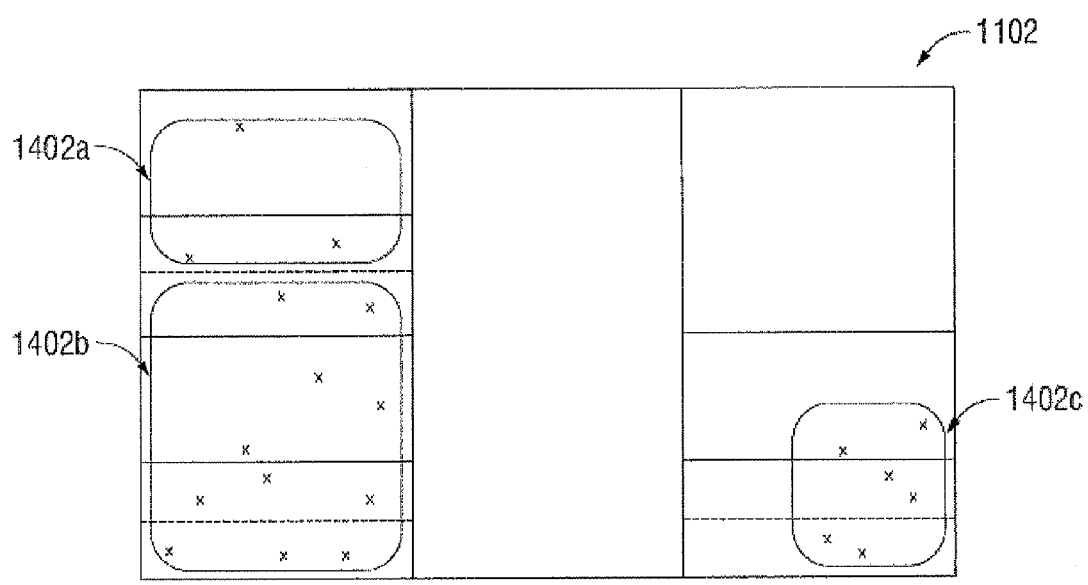
FIG. 14 shows the creation of new clusters from a single prior cluster, according to an embodiment.
Figure 15:
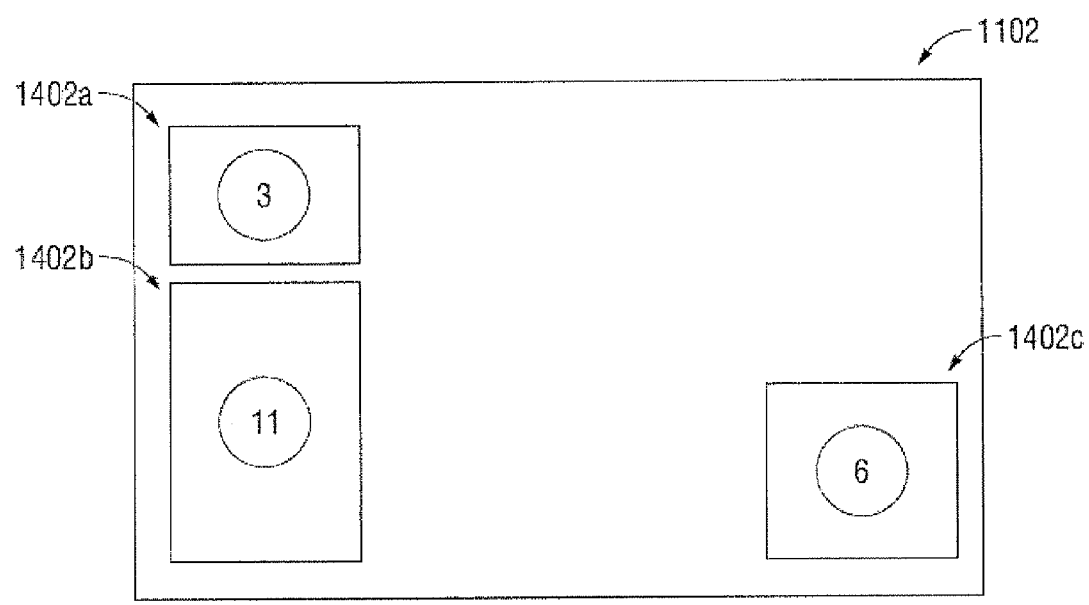
FIG. 15 illustrates three new clusters after completion of the splitting process, according to an embodiment.

Referring now to FIG. 11, depicted is a sample cluster 1100, with reference to a display screen 1102, that is to be split, according to an embodiment. As is apparent, cluster 1100 comprises 20 items (either assets or smaller clusters). As shown in FIG. 12, the cluster's items (indicated by Xs in the screen 1102) are located near both vertical edges of the screen 1102. As shown in FIG. 13, cluster 1100 (not shown) is split according to the embodiments discussed above with reference to FIGS. 9 and 10. The items in odd slots (1302b, 1302d, and 1302f) are moved to the even slots 1302a, 1302c, and 1302e. As shown in FIG. 14, three resulting new clusters 1402a-c are created. The final result, as shown in FIG. 15, are new clusters 1402a-c shown to the user in place of the old cluster, while the underlying items in the clusters 1402a-c are hidden from view.

Figure 16:
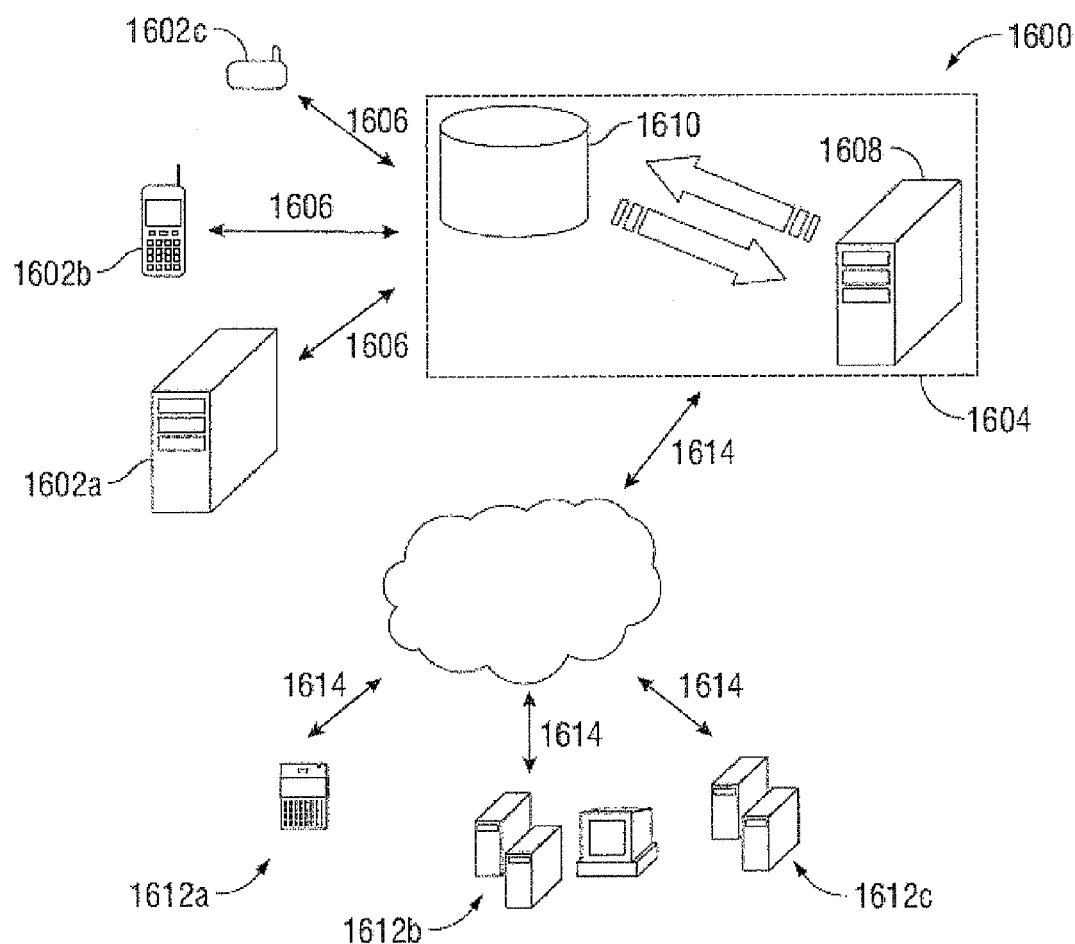
FIG. 16 depicts an overall system diagram of components and devices used in connection with embodiments.

Referring now to FIG. 16, depicted is an overall system diagram 1600 of components and devices used in connection with the forgoing systems and methods, according to an embodiment. Each asset (not shown) comprises a communication device 1602a-c. For instance, a vehicle may have a small transceiver device installed in its cabin, or an individual may carry a smartphone or similar device with location determination capabilities. Such devices 1602a-c may utilize, for example, GPS, inertial (gyro) systems, or cellular network based technologies, such as triangulation, to determine the latitude and longitude information for the asset.

Location, status, alarm, class, speed, and other types of pertinent information pertaining to a devices' asset may be provided by the devices 1602a-c to a central processing system 1604. In some embodiments, the devices 1602a-c communicate such information in real time. In other embodiments, such information is transmitted periodically, at random intervals, or on an alarm condition. Such transmissions are made, in some embodiments, via a wireless or satellite based communication system and/or over the internet or similar wide area network 1606, to the central processing system 1604.

The central processing system 1604, in some embodiments, comprises one or more web servers 1608 in communication with one or more databases 1610. The web servers 1608 may, in some embodiments, have high performance or computer clustering capabilities. The central processing system 1604, operates, in some embodiments, as follows:

- Information received by the devices 1602a-c is stored in the databases 1610.
- The web servers 1608 receive update requests from a client 1612a-c via the Internet or similar wide area network 1614
- The central processing system 1604 accesses pertinent information from the database 1610 and performs the clustering and map delivery processes discussed above in response to received requests, and
- The web servers 1604 transmit the resulting data to the client 1612a-c via the network 1614.

In some embodiments, the central processing system 1604 utilizes distributed or cloud computing capabilities and/or technology. In some embodiments, the central processing system 1604 shares computing responsibilities with a requesting client 1612a-c. In other embodiments, the central processing system 1604 is responsible for all or substantially all of the computing responsibilities. A benefit of the foregoing arrangements, in some embodiments, is that the amount of data that needs to be transferred from the web server 1608 to the client 1612a-c is very small. In some embodiments, little, if any, of the underlying asset information is transferred to clients 1612a-c. In these embodiments, merely the high-level cluster information showing the aggregated asset information (e.g. charts, numerical value, and/or bounding area information, such as that discussed with reference to FIG. 1) is transferred to the clients 1612a-c. These embodiments make it is possible to deal with a practically unlimited number of items, even when having a limited network capability and/or a hardware client 1612a-c with limited processing ability. Those of ordinary skill in the art will recognize that networks 1606 and 1614 may be the same or different networks. In some embodiments, both such networks will be the Internet. In other embodiments, networks 1606 and 1614 may comprise private and/or public networks.

A client 1612a-c may be, for example, a personal computer or a smart phone. In other embodiments, a client 1612a-c may itself be a server or central computer which is configured to transmit the information received by the central processing system 1640 to end-user clients (not shown). In some embodiments, the clients 1612a-c comprise a graphical user interface displayed in a browser window of a browser application. Such an arrangement permits an end user of a client 1612a-c to easily view the map, geographic information, cluster information, and the underlying asset data provided by the central processing system 1604. Thus, the system and its smart zooming capabilities can be utilized by any user with a client computing device capable of running a web browser and accessing a wide area network, such as the Internet.

In some embodiments, the graphical user interface is implemented using HTML, JavaScript, CSS, JSON, and/or XML programming. Such programming may be AJAX compliant. In some embodiments, a dynamic HTML page or XML content is created by the central processing system 1604 in response to a request by a client 1612a-c. Such interaction, in some embodiments, proceeds by the user of a client 1612a-c making XML API calls and/or Java Applet calls to the web server 1608 of the central processing system 1604. Using the techniques previously discussed, the central processing system 1604 generates clusters, asset information, and or other information requested by the user, and provides such content, along with the corresponding map data, to the client 1612a-c. The graphical user interface of the browser window thereafter displays such content for viewing by a user.

The smart zoom system and its graphical user interface can be implemented using technologies other than those described. For instance, in one embodiment, the graphical user interface is implemented as an Adobe Flash object. In some embodiments, where the graphical user interface is implemented using Flash, the graphical user interface is embedded in an HTML page and executed by a Flash compatible plug-in for the browser application. The Flash object stores data files and/or communicates with the central processing system receive updated map, cluster, and asset information. In other embodiments, technologies such as Java, Java Applets, Synchronized Multimedia Integration Language (SMIL), or Microsoft Silverlight are used to implement the graphical user interface and to interact with the central processing system 1604. In other embodiments, the graphical user interface is executed by a standalone player external from the browser application or other specialized program used to access the central processing system 1604.

As is apparent, the described smart zoom clustering methods and systems allow diverse user tools and interfaces to permit any number of end user clients to visualize hundreds or thousands of assets and their real time location and status. By utilizing the forgoing smart zoom systems and methods, a vehicle fleet or other asset manager can quickly and easily determine the status of hundred of assets, identify problems with the assets, redeploy assets as needed, and make other managerial decisions in a manner not possible using other methods and systems.

A further embodiment is computer readable code or program instructions on one or more computer readable mediums capable of carrying out processes discussed above. A computer readable medium is any data storage device that is capable of storing data, or capable of permitting stored data to be read by a computer system. Examples include hard disk drives (HDDs), flash memory cards, such as CF cards, SD cards, MS cards, and xD cards, network attached storage (NAS), read-only memory (ROM), random-access memory (RAM), CD-ROMs, CD-Rs, CD-RWs, DVDs, DVD-Rs, DVD-RWs, holographic storage mediums, magnetic tapes and other optical and non-optical data storage devices. The computer readable medium can also be in distributed fashion over multiple computer systems or devices which are coupled or otherwise networked together and capable of presenting a single view to a user of the medium.

Yet another embodiment is a computer system or similar device configured to access computer readable code or program instructions from a computer readable medium and to execute program instructions using one or more CPUs to carry out embodiments as described. Such computer system can be, but is not limited to, a typical personal computer, microcomputers, a handheld device such as a cell phone, PDA, BlackBerry, or a more advanced system such as a computer cluster, distributed computer system, server accessed over wired or wireless devices, a mainframe, or a supercomputer. In another embodiment, the server(s) of the system are also stored in and accessed from the computer readable medium. In other embodiments, they are implemented using hardware.

In some embodiments, some or all of the content stored in the computer readable medium is transmitted via a similar network. In other embodiments, the central processing system generates signals or instructions based on the results of the program instructions and/or the contents of the computer readable medium.

In other embodiments, the foregoing systems and methods are applicable to environments other than those in two dimensions. For instance, three dimensional clusters, maps, bounding areas, and assets can be implemented using the same techniques and methods discussed above.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein.

The invention claimed is:

1. A method for displaying information pertaining to a plurality of geographically related assets, the method comprising:
   receiving information pertaining to a plurality of assets, wherein the assets are vehicles;
   selecting the assets from the plurality of assets that are geographically related, wherein the assets are geographically related if the physical location of the assets are within a geographic area defined by a virtual bounding area;
   forming a cluster comprising the selected assets;
   providing a graphical user interface comprising a geographic map and the cluster, wherein the cluster is overlaid on the geographic map in the geographic area defined by the bounding area; wherein the cluster displays on the graphical user interface at least one item of information pertaining to the selected assets; and
   splitting a cluster of assets, wherein each asset has pixel coordinates based on its geospatial location and in reference to a virtual area representing an end user's display;
   identifying the coordinates of each asset; dividing the virtual area into slots; grouping the assets into the slots based on each assets' pixel coordinates; and generating new clusters, wherein each new cluster comprises at least one asset and comprises every asset which was grouped into the same slot.

2. The method of claim 1, wherein the information pertaining to the plurality of assets is updated in real time.

3. The method of claim 1, wherein the at least one item of information is a chart displaying status information for the selected assets.

4. The method of claim 1, wherein the at least one item of information is a chart displaying the class information for the selected assets.

5. The method of claim 1, where the at least one item of information is a numerical indication of the number of selected assets.

6. The method of claim 1, wherein the graphical user interface displays the virtual bounding area.

7. The method of claim 1, further comprising adding the cluster to a new cluster if a user of the graphical user interface zooms out from the geographic map.

8. The method of claim 1, further comprising splitting the cluster into a plurality of clusters if a user of the graphical user interface zooms in on the geographic map.

9. A method for displaying information pertaining to a plurality of geographically related assets, the method comprising:
   receiving information pertaining to a plurality of assets, wherein the assets are vehicles;
   selecting the assets from the plurality of assets that are geographically related, wherein the assets are geographically related if the physical location of the assets are within a geographic area defined by a virtual bounding area;
   forming a cluster comprising the selected assets;
   providing a graphical user interface comprising a geographic map and the cluster, wherein the cluster is overlaid on the geographic map in the geographic area defined by the bounding area; wherein the cluster displays on the graphical user interface at least one item of information pertaining to the selected assets; and
   clustering assets, wherein each asset has pixel coordinates based on the asset's geospatial location and in reference to a virtual area representing an end user's display;
   determining an icon shape with specific pixel dimensions for use in connection with each asset; querying a data structure with the icon shape for each asset; adding an asset as a new cluster in the data structure if the area defined by the pixel dimensions of the asset's icon shape, when centered over the asset's pixel coordinates, does not overlap with the area covered by another cluster in the data structure; and adding an asset to an existing cluster in the data structure if the area defined by the pixel dimensions of the asset's icon shape, when centered over the asset's pixel coordinates, overlaps with the area covered by the existing cluster.

* * * * *

UNITED STATES PATENT AND TRADEMARK OFFICE
CERTIFICATE OF CORRECTION

PATENT NO. : 8,745,516 B2
APPLICATION NO. : 12/882930
DATED : June 3, 2014
INVENTOR(S) : Ralph James Mason It is certified that error appears in the above-identified patent and that said Letters Patent is hereby corrected as shown below:

On the Title Page

In column 1 (page 2, item 56) line 65, References Cited under Other Publications, change "GPSR" to --GPRS--.

In column 2 (page 2, item 56) line 6, References Cited under Other Publications, change "GPS/GPSR" to --GPS/GPRS--.

In the Specification

In column 2 line 26, Change "overlayed" to --overlaid--.

In column 2 line 52, Change "assets'" to --asset's--.

In column 4 line 30, Change "class," to --class.--.

In column 4 line 60, Change "dependant" to --dependent--.

In column 7 line 26, Change "FIG. 5b," to --FIG. 8b,--.

In column 7 line 39, Change "FIG. 5b," to --FIG. 8b,--.

In column 8 line 19, Change "$X_{split}$," to --$X_{split}$--.

In column 10 line 16, Change "and or" to --and/or--.

In the Claims

In column 11 line 55 (approx.), In Claim 1, change "assets'" to --asset's--.

Signed and Sealed this
Sixth Day of January, 2015

Michelle K. Lee
*Deputy Director of the United States Patent and Trademark Office*